Feb. 27, 1968     A. R. JACCARD     3,370,960
PROCESS FOR PREPARING TENDERIZED ELEMENTARY MEAT PRODUCTS
Original Filed Oct. 18, 1965     2 Sheets-Sheet 1
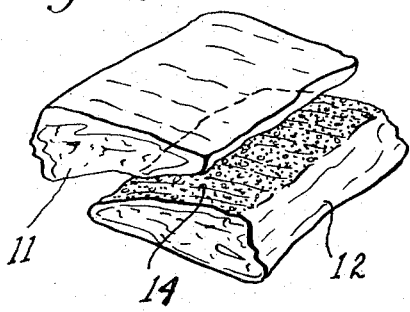
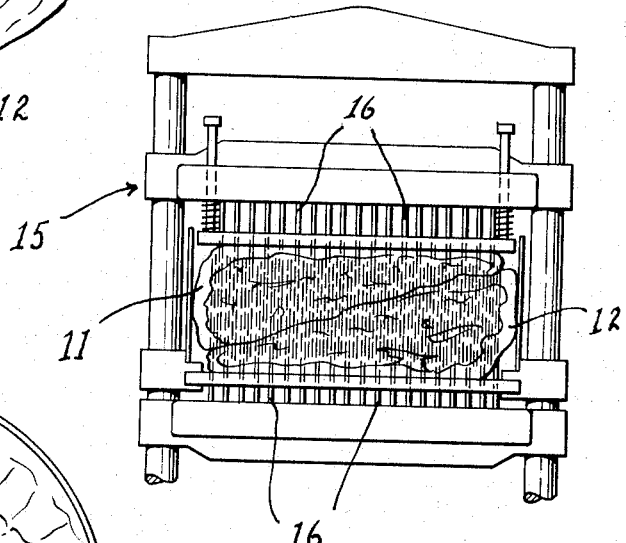
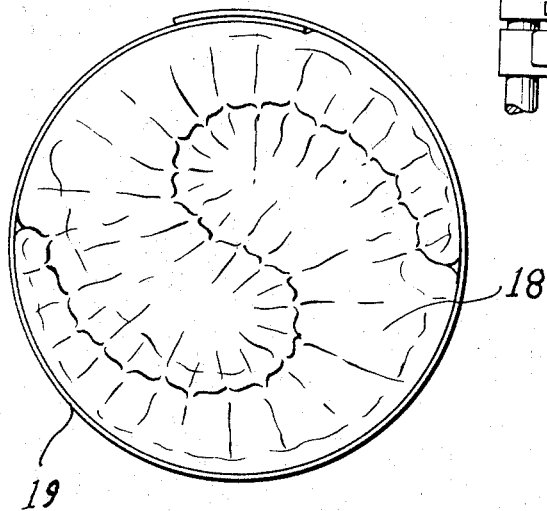
INVENTOR
ANDRÉ R. JACCARD
BY
*Allan F. Harlan Jr.*
ATTORNEY Feb. 27, 1968    A. R. JACCARD    3,370,960
PROCESS FOR PREPARING TENDERIZED
ELEMENTARY MEAT PRODUCTS
Original Filed Oct. 18, 1965    2 Sheets-Sheet 2
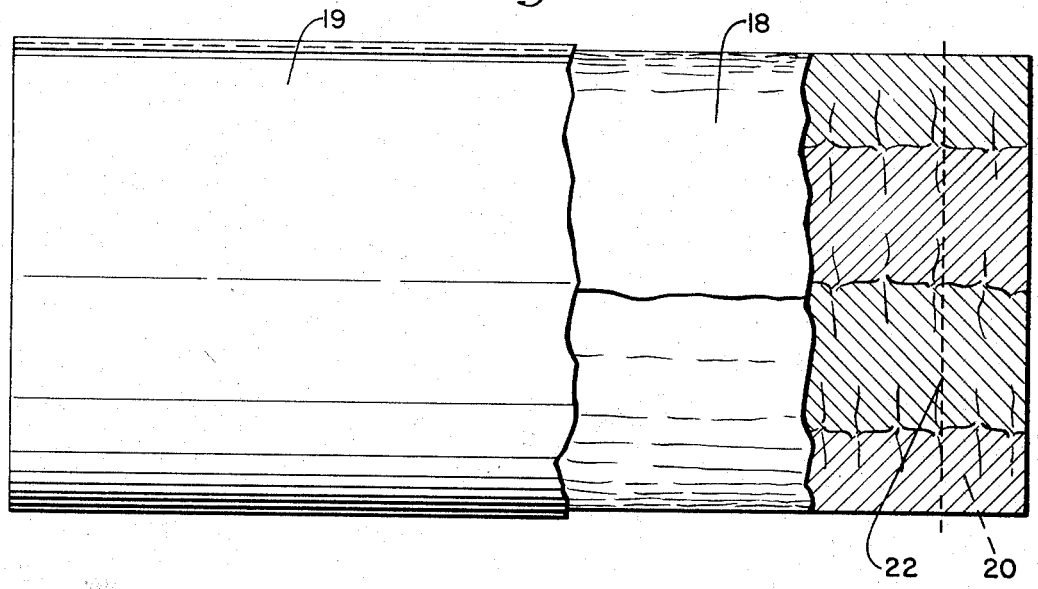
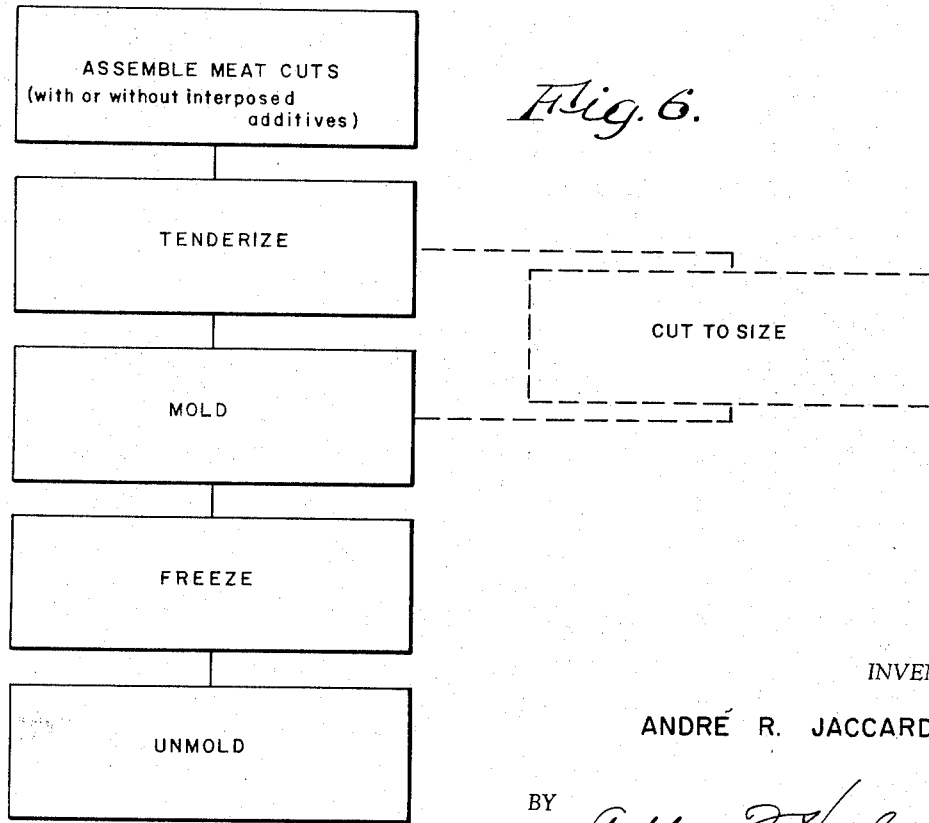
INVENTOR
ANDRÉ R. JACCARD
BY
ATTORNEY

3,370,960
PROCESS FOR PREPARING TENDERIZED ELEMENTARY MEAT PRODUCTS
André R. Jaccard, 67 Greenfield St., Buffalo, N.Y. 14214
Continuation of application Ser. No. 508,623, Oct. 18, 1965. This application Oct. 31, 1966, Ser. No. 591,022
6 Claims. (Cl. 99—107)

ABSTRACT OF THE DISCLOSURE

Tenderized composite meat cuts are produced by producing a multitude of incisions in a plurality of stacked elementary meat cuts without destroying the meat structure and while maintaining the natural meat juices, said incisions extending through a substantial portion of each of said elementary cuts thereby aiding adherence of the contacting surfaces of said cuts, and molding the resultant composite cut to a desired shape. The composite cuts may be chilled or frozen and may be divided into portions each of which comprises a part of each of said elementary cuts and said parts being adherent one to another. If desired granular gelatin may be placed between the contacting surfaces only of said elementary cuts before tenderizing.

---

This application is a continuation of application Ser. No. 508,623, filed Oct. 18, 1965 and now abandoned.

The invention of this application relates to the preparation of shaped meat products and is particularly useful in the preparation of novel, improved meat products that can be packaged as individual or multiple portions.

It is an object of the invention to provide a novel and inexpensive process whereby individual or multiple portions or servings of tenderized meat may be conveniently prepared from elementary cuts of meat.

Another object of the invention is to provide a process as set forth above in which a plurality of elementary cuts of meat are combined to form novel, tenderized, composite meat cuts.

Another object of the invention is to provide a novel process for preparing individual or multiple servings of tenderized meat each of which comprises a plurality of individual pieces of meat and in which both the pieces of meat and the servings as used have substantially the original meat structure.

Other objects and advantages of the present invention will be apparent from the following description taken in conjunction with the accompanying drawings which illustrate one application or embodiment of the invention and in which:

FIGURE 1 is a perspective view showing two similar elementary cuts of meat arranged for placing together for treatment in accordance with the present invention;

FIGURE 2 is an elevational view illustrating the tenderizing treatment of the combined or assembled elementary cuts of meat;

FIGURE 3 is an enlarged end view of a mold containing a molded composite cut of meat in accordance with the invention;

FIGURE 4 is a perspective view of a serving or portion of meat prepared according to the invention from a composite cut such as shown in FIGURE 3;

FIGURE 5 is a plan view, partly in section, of a molded composite meat cut such as illustrated in FIGURE 3; and FIGURE 6 is a flow chart illustrating the several steps involved in carrying out the process of the present invention in a preferred way.

The terms "elementary cut" and "elementary cuts" (with or without the word "meat" associated therewith) as used in the following description and the appended claims are intended to identify the cuts of meat generally known as primal cuts, wholesale market cuts, and fabricated cuts, i.e. meat cuts derived by operations such as boning, trimming, rolling, and the like from carcasses and wholesale market cuts. The terms are intended to exclude meat that has been sawed or cut into slices or has been diced, cut, chopped, or sawed to produce small chunks or strips (for example, stew meat), or has been ground.

The term "composite cut" (with or without the word "meat" associated therewith) as used in the following description and the appended claims, is intended to identify a meat product obtained by combining, according to the process of the present invention, a plurality of "elementary cuts." The term is intended to exclude meat that has been sawed or cut into slices or has been diced, cut, chopped, or sawed to produce small chunks or strips (for example, stew meat), or has been ground, and any meat products containing or made from such excluded meat.

As outlined in FIGURE 6, the present invention in its preferred form comprehends the assembly or placing together in stacked relation of a plurality of elementary cuts of meat, with or without the use of interposed additives; the mechanical tenderizing of the elementary cuts in such assembly in such a way as to retain the natural meat juices and to aid or cause adherence of the cuts into a composite meat cut without destroying the meat structure; shaping or molding the resulting composite cut, after cutting to size if desired or necessary; freezing the shaped composite cut; and unmolding it to give a meat product which may be sawed or sliced into adherent individual or multiple servings or portions each of which comprises a plurality of pieces of meat.

A more specific description of the manner in which the present novel process is carried out is given below in conjunction with FIGURES 1 to 5 of the drawings. These illustrate the assembly and treatment of two elementary cuts of meat to form a composite cut.

In FIGURE 1 the numerals 11 and 12 designate two elementary cuts of beef, such as boneless strip loins, which, as shown, are stacked or placed one over the other and preferably are so disposed that the shapes of the two cuts are more or less complementary. Preferably powdered or granular gelatin is placed between the cuts and, if desired, a small amount of monosodium glutamate may also be placed between the contacting surfaces. Such additives are indicated at 14.

In FIGURE 2 the numeral 15 designates, in general, a meat tenderizing machine. The particular design of the machine is not a part of the present invention. It is important, however, that the tenderizing machine used be of the type which comprises a plurality of sharp piercing tools such as needles or the like 16 that may be repeatedly thrust deeply into meat so as to cut or tear tough fibers and make the meat more easily chewed without, however, destroying the meat structure. A number of such machines have been described in the prior art. See for example, U.S. Patents Nos. 1,987,349, and 2,830,317. The elementary meat cuts 11 and 12, assembled as described above, are placed in the tenderizing machine and repeatedly subjected to penetration by the needles or the like of the machine, the assembly being moved between successive penetrations so that the needles or the like pierce the assembly at a great number of points thereby producing thorough tenderizing. It is preferred that penetration of the meat by the piercing tools be from above the meat only, since moving the assembly of meat cuts between the repeated action of the needles or the like is usually simpler in such case. The tenderizing may be so regulated or controlled as to give the meat any degree of tenderness desired, and it is important that the needles or the like penetrate deeply so as to produce a multitude of incisions that extend through at least a substantial portion of each of the cuts 11 and 12.

In the course of the tenderizing, it is found that the contacting surfaces of elementary cuts 11 and 12 become adherent. This is due in part to the gelatin when gelatin is used between the cuts, but also is due in part to a mechanical linkage between the cuts resulting from the deep incisions produced by the tenderizing mechanism.

The comprise cut 18 resulting from the tenderizing treatment is then molded or shaped, after cutting to size if desirable or necessary. This can be done by hand although a mold of desired shape is usually preferred. In FIGURE 3 the composite cut is shown in a tubular mold 19 which is held in position by suitable clamping means (not shown) and results in an elongated roll. Preferably the composite cut is chilled in the mold although it can be so treated after removal from the mold. As employed hereinafter in this description and the appended claims, "chilled" is intended to include or comprehend "frozen" except where the opposite intention is obvious. That is, chilling may be regarded as incomplete freezing or freezing may be regarded as chilling to the point of solidifying all of the liquids in the meat. Freezing, of course, will generally be preferred for meat that is not to be consumed for a long period of time and may be preferred in other cases where the meat is shipped or subjected to considerable handling since there will be less chance of spoiling.

Individual servings such as the filet mignon 20 shown in FIGURE 4 may be sawed or sliced from the composite cut 18 before or after chilling. In most cases it will be advantageous for economy and convenience in storage, shipment, and handling to keep the composite cuts whole and chilled and only slice or saw off servings shortly before they are required for use. It will be evident from FIGURE 5 that a filet mignon 20 that is sliced, for example, along the broken line 22, from the composite cut 18 will be shaped as a substantially flat disc with a generally circular periphery and will comprise a plurality of pieces of meat not in excess of the number of elementary cuts in said composite cut. Each of said pieces of meat although tenderized, will be solid and, as pointed out above, have the structure of the original meat. This is quite unlike a patty or similar meat product formed of ground, chopped, or thinly sliced meat since in such products the original meat structure has been destroyed.

It will be understood that if desired more than two elementary cuts of meat can be assembled for tenderizing treatment as described above in order to form a single composite cut. As in the foregoing example, the elementary cuts become adherent at least partially as a result of the penetration of the needles or the like of the tenderizing machine to form a plurality of deep incisions that extend through at least a substantial part of each of the elementary cuts.

It will also be understood that the type of elementary cuts used may vary as desired although in general lean elementary cuts in which at least one dimension is materially greater than another, e.g. flat cuts, are preferred. The final shape of the composite cut of meat formed by carrying out the present novel process may also be varied and any desired shape can be produced. Although, as illustrated, composite cuts may be sawed or sliced into individual servings, they may also be used for roasts or may be sliced or sawed to form smaller, multi-serving portions.

The meat products of the present invention a number of advantages. In the first place, no chemical tenderizers are employed. As pointed out above, gelatin and mono- sodium glutamate may be used, but are not necessary. In the second place, the present process, unlike some previously known, does not utilize excessive bruising of the meat to tenderize it nor is the treatment such that the meat juices are needlessly lost. Instead, they are retained in the meat and thus the flavor of the meat is improved. In this connection it should be noted that the cooking time required for meat subjected to the present novel process is reduced to a little as 60% of the normal cooking time. Such a reduction results in less cooking shrinkage and better flavor. From the standpoint of the meat dealer or processor, the present process presents an opportunity to use lower grade cuts of meat, profitably, to prepare composite cuts of any size and shape desired, and to obtain individual servings of meat of substantially uniform size and weight. The consumer benefits in obtaining at a reasonable price meat which is flavorful, tender, and attractively and/or usefully shaped.

The present process is applicable to any kind of meat, i.e. pork, veal, beef, lamb, mutton and the like. Further, the meat subjected to the process may be fresh, chilled or defrosted. Cured meat is also useable where the curing does not result in substantial dessication or other change of the meat surfaces. It will, of course, be understood that the portion of the meat to be tenderized must be free of bones. Boned elementary cuts are therefore usable. In the event that it is desired to leave one or more bones in a part of a composite cut made according to the invention, the tenderizing must be carefully controlled to avoid striking the bones with the needles or the like of the tenderizer.

I claim:

1. A process for producing a tenderized, composite meat cut which comprises assemblying in stacked relation a plurality of elementary meat cuts, tenderizing said elementary cuts without destroying the meat structure while retaining the natural meat juices and while maintaining said elementary cuts in stacked relation by producing therein a multitude of incisions that extend through a substantial portion of each of said elementary cuts, thereby aiding the adherence of the contacting surfaces of said elementary cuts to form a composite cut, and molding said composite cut to a desired shape.

2. A process as set forth in claim 1 in which said shaped composite cut is chilled.

3. A process as set forth in claim 1 in which granular gelatin is placed between the contacting surfaces only of said elementary cuts before tenderizing them.

4. A process as set forth in claim 1 in which said shaped composite cut is frozen.

5. A process as set forth in claim 1 in which granular gelatin is placed between the contacting surfaces only of said elementary cuts before tenderizing them and said shaped composite cut is chilled.

6. A process for preparing composite meat products which comprises producing a tenderized composite meat cut according to claim 5 and thereafter dividing said composite cut into a plurality of portions without separating said elementary cuts, each of said portions comprising a part of each of said elementary cuts, said parts being adherent one to another, but containing no greater number of separate pieces of meat than the number of elementary cuts in said composite cut.

References Cited

UNITED STATES PATENTS

| 1,427,438 | 8/1922 | Brickman | 99—107 |
| 2,253,123 | 8/1941 | Hart | 17—25 |
| 2,323,769 | 7/1943 | Hansen | 17—25 |
| 2,398,636 | 4/1946 | Henney et al. | 99—107 |
| 2,673,156 | 3/1954 | Minder | 99—194 X |
| 2,808,335 | 10/1957 | Pierce | 99—107 |

HYMAN LORD, *Primary Examiner.*

UNITED STATES PATENT OFFICE
CERTIFICATE OF CORRECTION

Patent No. 3,370,960      Dated February 27, 1968

Inventor(s)     Andre R. Jaccard

It is certified that error appears in the above-identified patent and that said Letters Patent are hereby corrected as shown below:

Column 3; line 15, "comprise" should read -- composite --; line 73, -- present -- should be inserted before "a".

Column 4; line 9, "a" should read -- as --.

SIGNED AND SEALED
FEB 2 1971

(SEAL)
Attest:

Edward M. Fletcher, Jr.
Attesting Officer

WILLIAM E. SCHUYLER, JR.
Commissioner of Patents